(12) United States Patent
Kim et al.

(10) Patent No.: US 6,724,219 B1
(45) Date of Patent: Apr. 20, 2004

(54) AMPLIFIER AND LINE DRIVER FOR BROADBAND COMMUNICATIONS

(75) Inventors: Chun-Sup Kim, Cupertino, CA (US); Ara Bicakci, San Jose, CA (US); Cormac S. Conroy, Sunnyvale, CA (US); Sang-Soo Lee, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 374 days.

(21) Appl. No.: 09/882,499

(22) Filed: Jun. 15, 2001

(51) Int. Cl.$^7$ ................................................ H04B 3/03
(52) U.S. Cl. .................... 326/30; 375/257; 375/258; 333/117; 333/120
(58) Field of Search ...................... 326/30, 86; 327/379, 327/427, 431, 434; 375/257, 258; 333/117, 120, 12

(56) References Cited

U.S. PATENT DOCUMENTS

| | | | |
|---|---|---|---|
| 5,121,080 A | 6/1992 | Scott, III et al. ........... 330/260 |
| 5,585,763 A | 12/1996 | Navabi et al. ............... 330/255 |
| 5,920,468 A | * 7/1999 | Brisson et al. ................ 363/39 |
| 6,016,084 A | * 1/2000 | Sugimoto .................... 333/12 |
| 6,163,579 A | * 12/2000 | Harrington et al. ......... 375/257 |
| 6,211,719 B1 | * 4/2001 | deBrigard .................... 327/379 |

OTHER PUBLICATIONS

Mahadevan et al., "A Differential 160–MHz Self Terminating Adaptive CMOS Line Driver", Dec. 2000, IEEE Journal of Solid–State Circuits, vol. 35, No. 12, pp. 1889–1894.

* cited by examiner

Primary Examiner—Michael Tokar
Assistant Examiner—Vibol Tan
(74) Attorney, Agent, or Firm—Thelen Reid & Priest, L.L.P.

(57) ABSTRACT

A line driver for coupling a data transceiver to a transmission line having a load impedance via a transformer with a turns ratio of 1:n includes an input port for receiving an input signal voltage from the data transceiver, an output port for supplying an output signal voltage to the transformer, and an amplifier circuit for amplifying the input signal voltage. The amplifier circuit includes a first output stage, a second output stage coupled to the output port, an output resistor coupled to the first output stage, a feedback path from the first output stage to an input of the amplifier circuit, and a line matching network coupled between the first output stage and the second output stage, for compensating variations in the load impedance, so that a synthesized output impedance of the line driver substantially matches an actual load impedance Z of the transmission line.

41 Claims, 6 Drawing Sheets

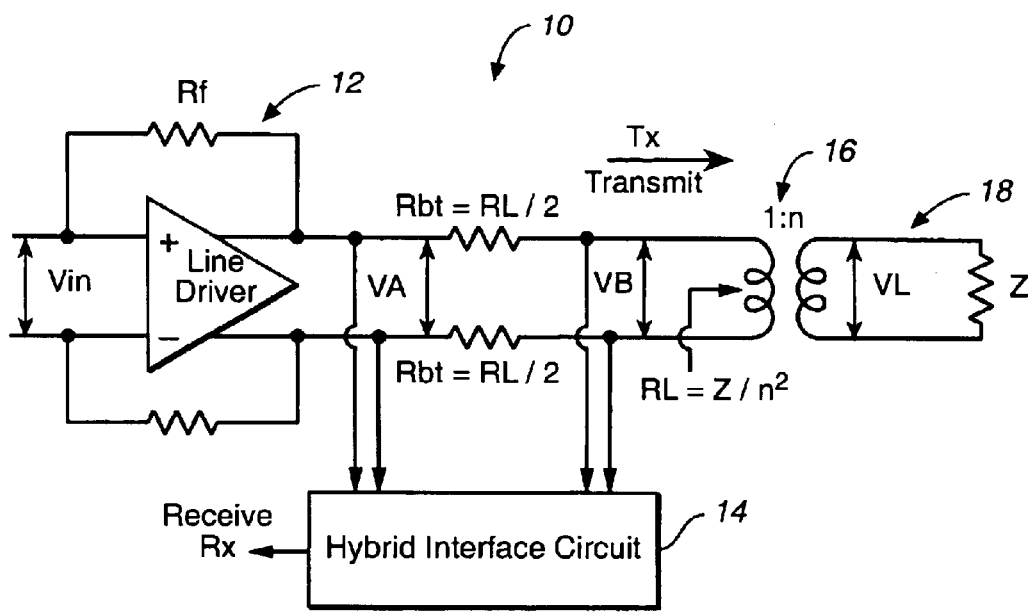
FIG._1
(PRIOR ART)
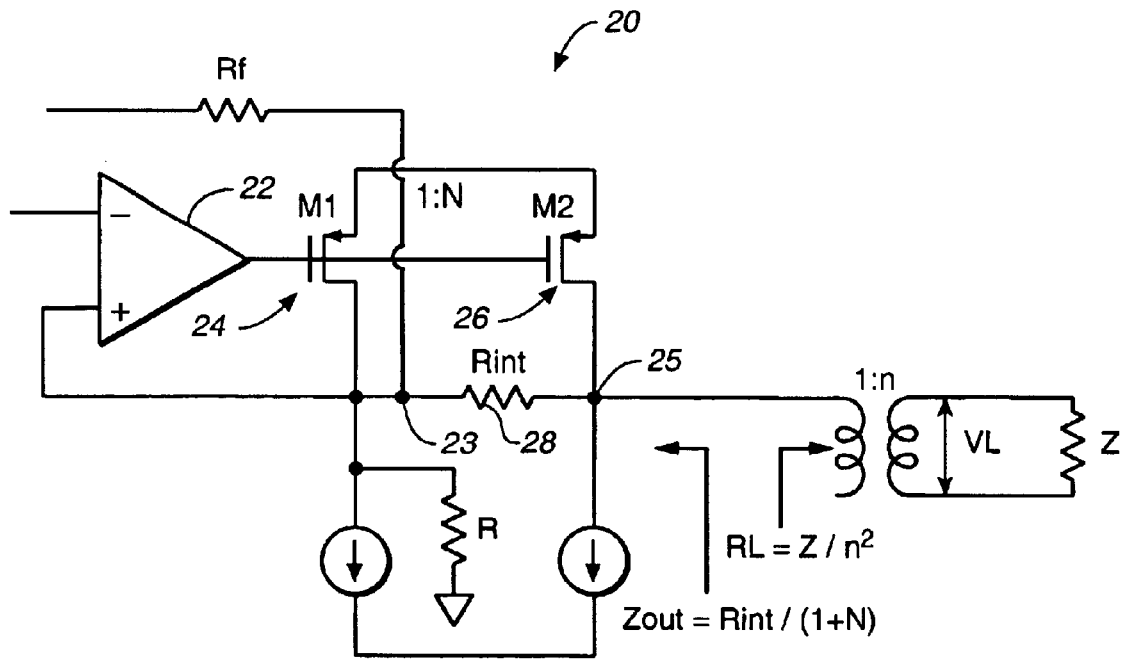
FIG._2
(PRIOR ART)

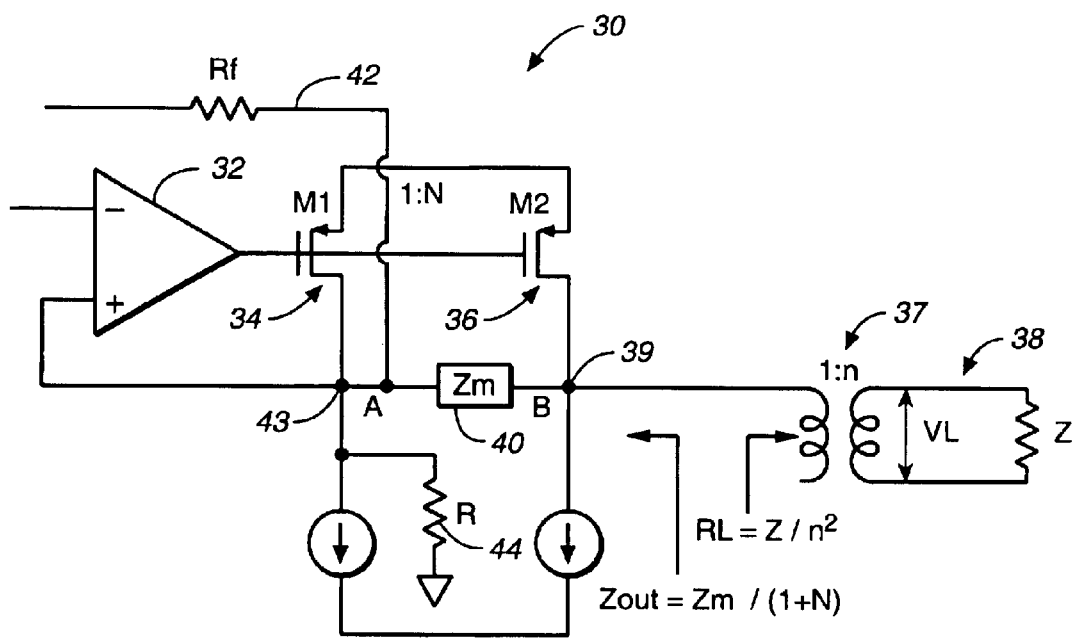
FIG._3
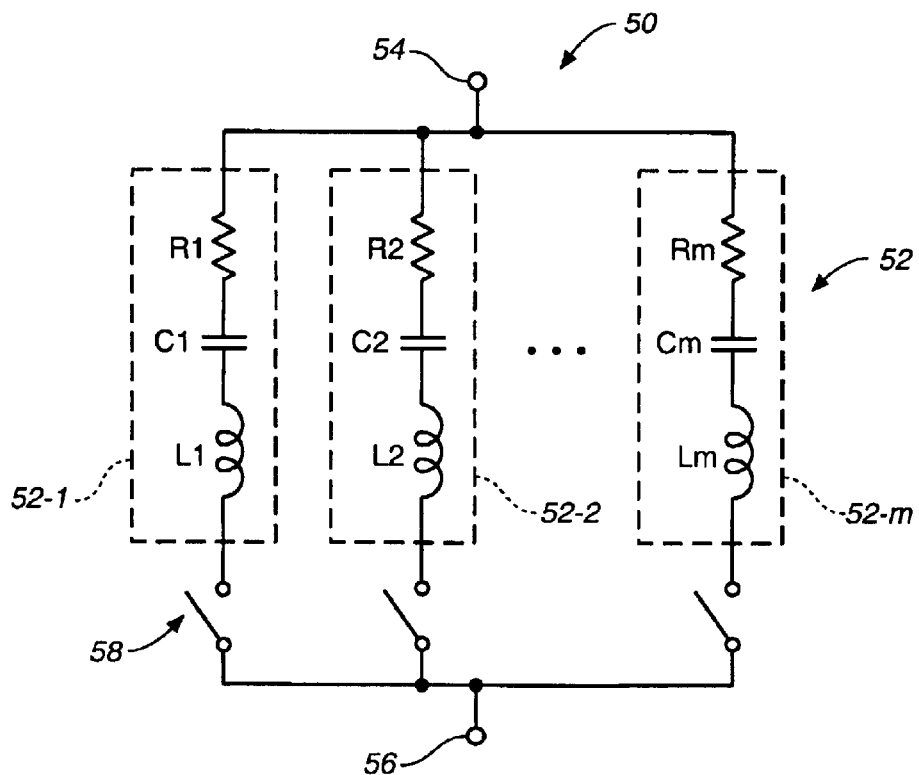
FIG._4

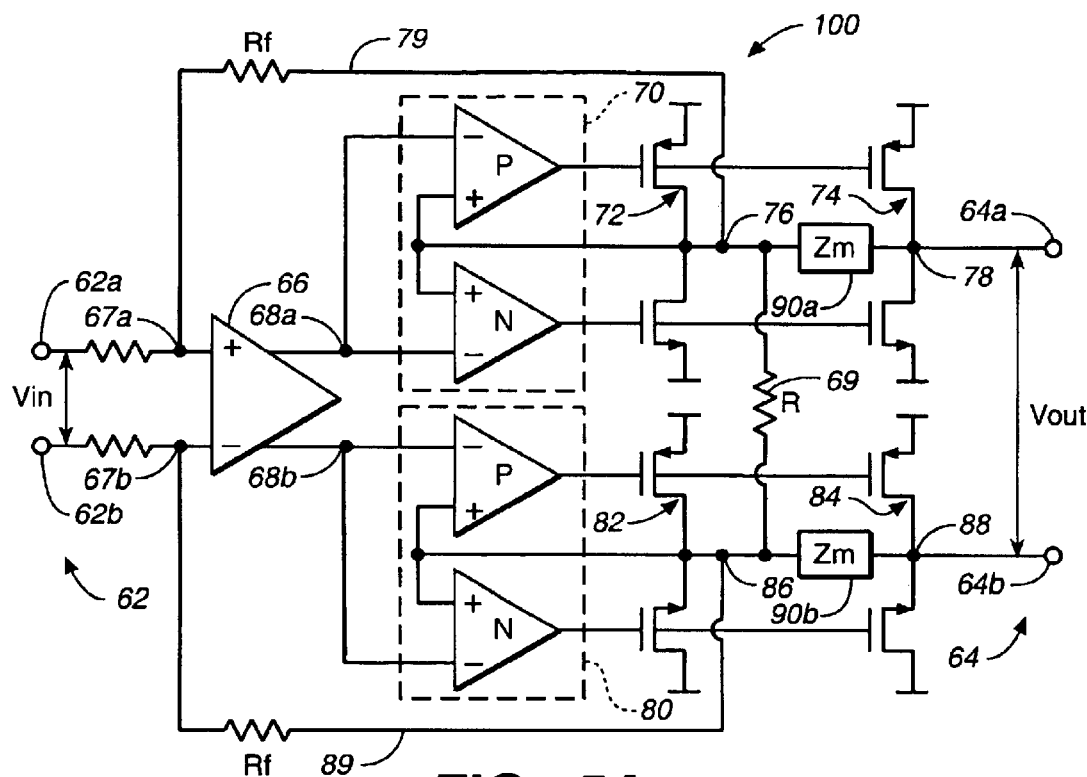
FIG._5A
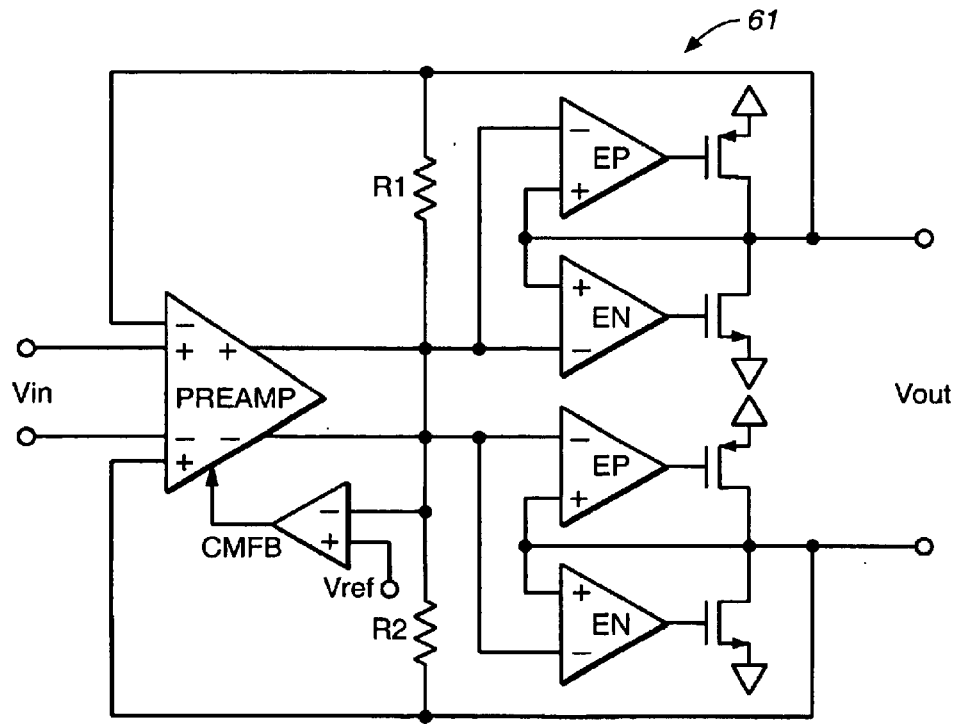
FIG._5B

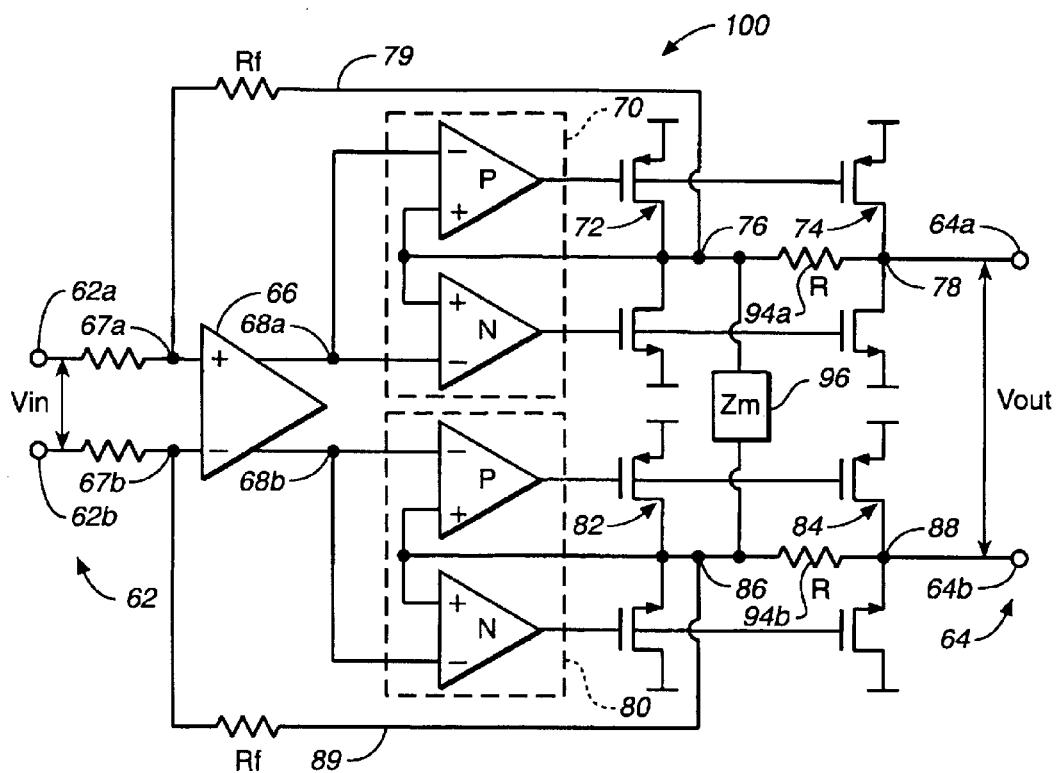
FIG._6
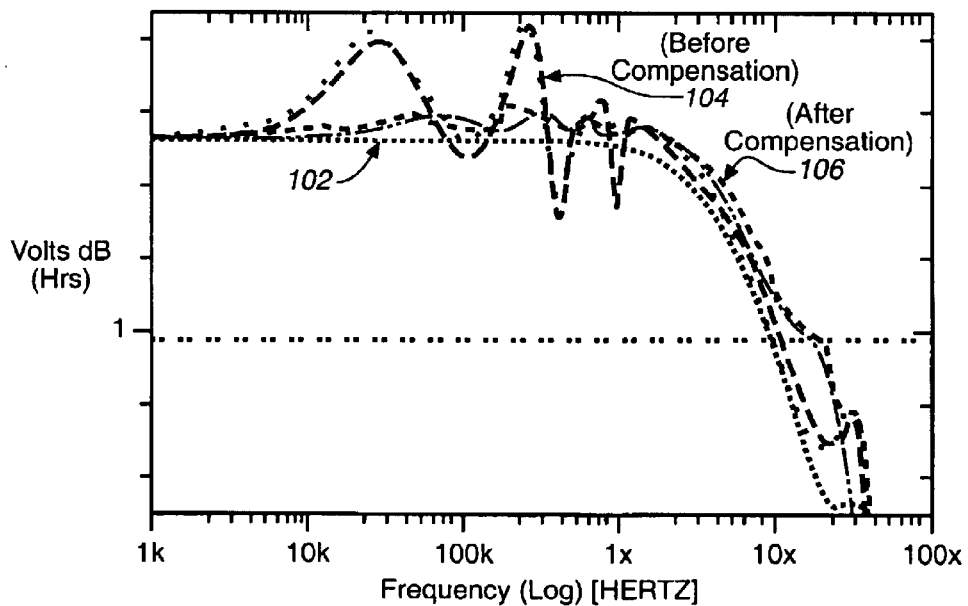
FIG._7

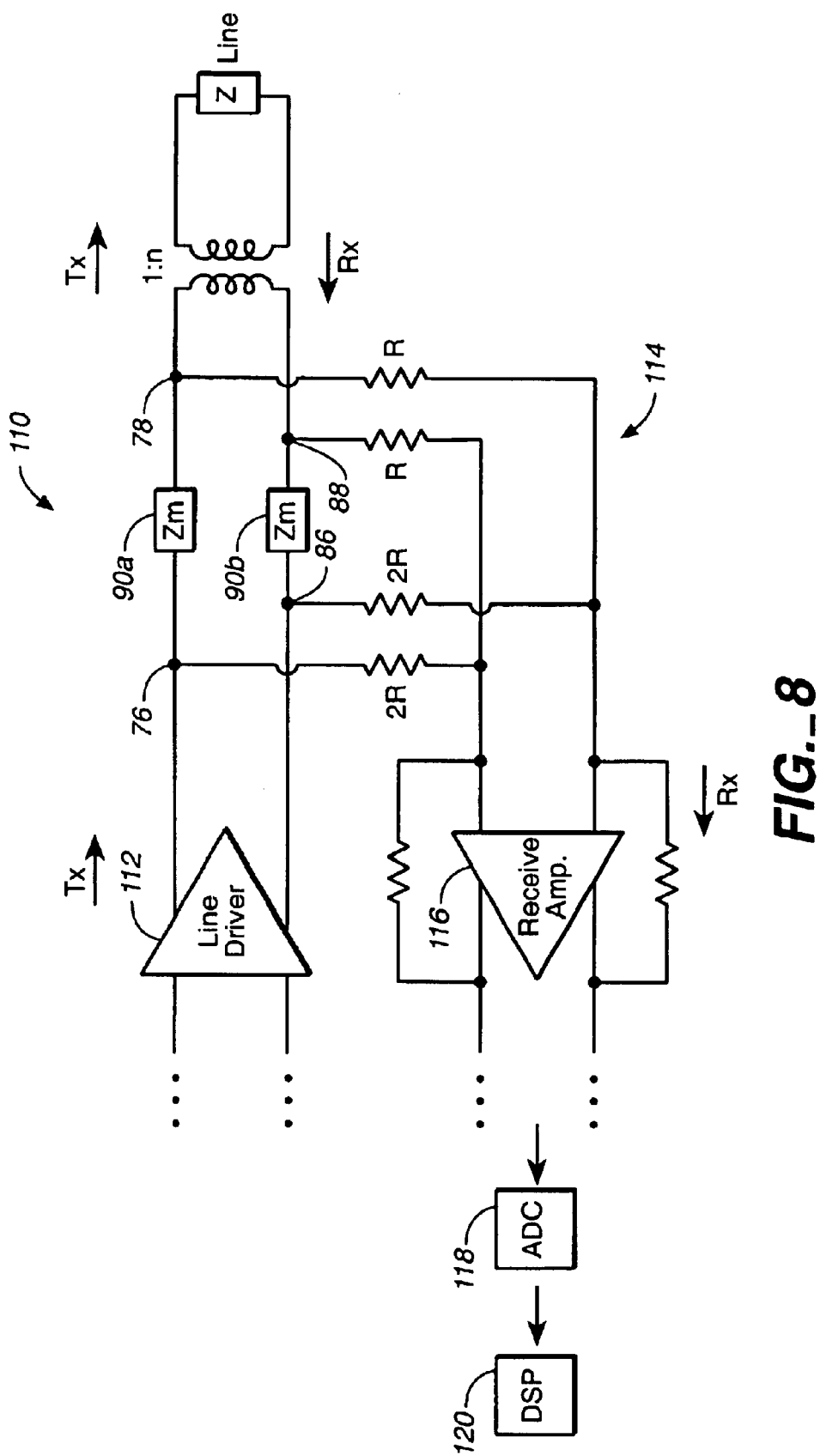
FIG._8

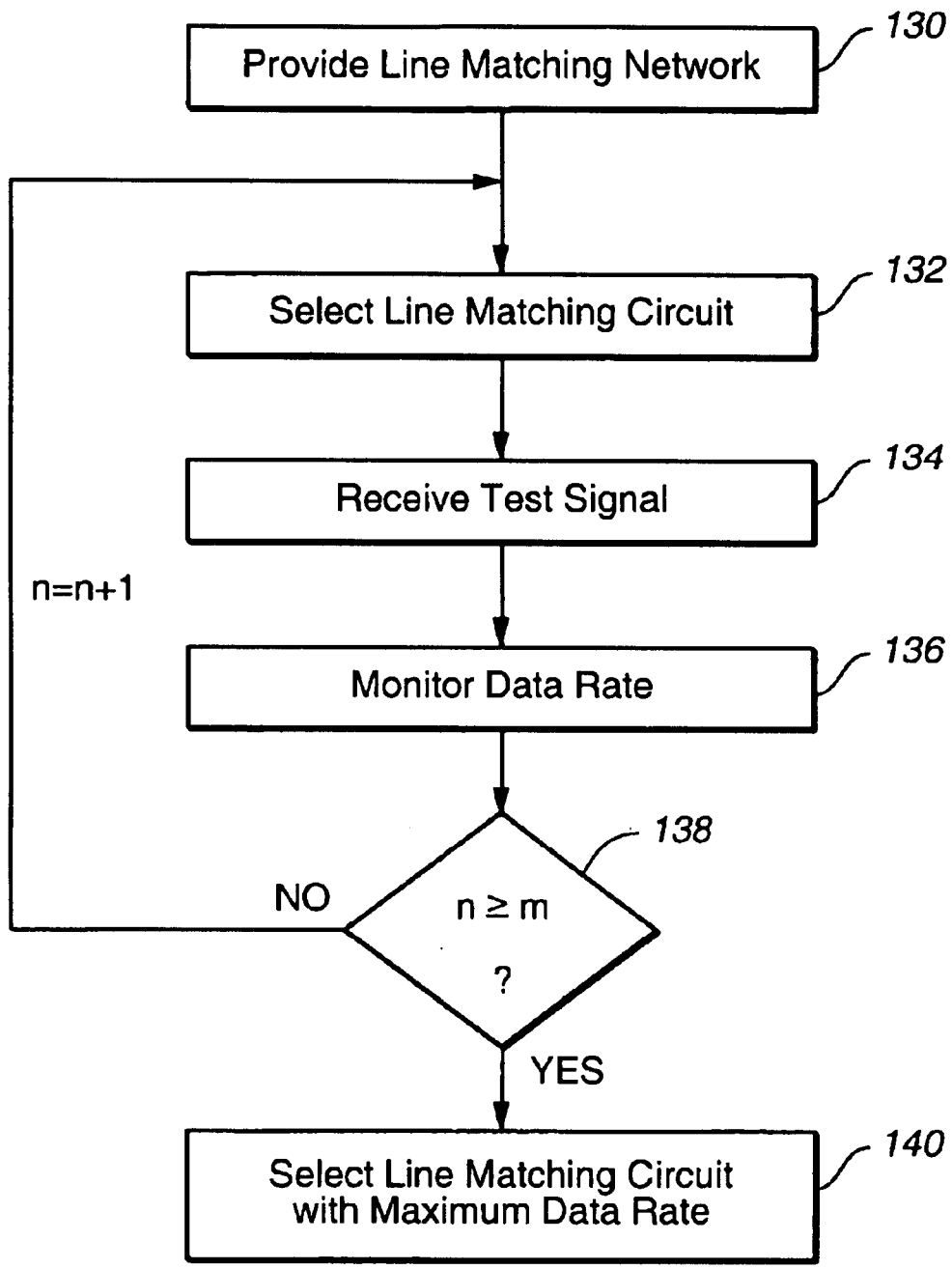
FIG._9

AMPLIFIER AND LINE DRIVER FOR BROADBAND COMMUNICATIONS

FIELD OF THE INVENTION

Me present invention relates to broadband communications and digital subscriber line (DSL) technologies. More particularly, the present invention relates to amplifiers and line drivers employing active termination to synthesize the output impedance.

BACKGROUND OF THE INVENTION

FIG. 1 illustrates a traditional line interface 10 including a line driver amplifier 12, a hybrid circuit 14, and a transformer 16. The transformer 16 has a turns ratio of 1:n, and couples a transmit signal (TX) from the line driver amplifier 12 to the transmission line 18 having a load impedance Z (typically Z=100Ω). A matching resistor (often referred to as a back termination resistor $R_{bt}$) is usually required between the amplifier 12 and the transformer 16 to implement a full duplex transmission and hybrid rejection. The value of the back termination resistor $R_{bt}$ is selected to match the line impedance $R_L$ seen by the amplifier 12, and each of the back termination resistors $R_{bt}$ has a value of $R_L/2$ for a differential structure as shown in FIG. 1.

Although the back termination resistors Rub are necessary in order to properly terminate the receive signal and also to detect receive signal developed across the resistors, they waste one half of the power provided by the line driver amplifier 12. Therefore, the signal swing $V_A$ output from the amplifier 12 is twice as large as the signal swing $V_B$ supplied to the transformer 16. That is, the same amount of power as that is required to the transmission line 18 is dissipated at the matching resistors $R_{bt}$.

The purpose of active termination or synthesizing impedance is to reduce the power dissipation of the amplifier in the back termination resistors. FIG. 2 illustrates one scheme 20 to implement active termination to synthesize the output impedance of the amplifier, which simulates the back termination resistor within the amplifier itself. As shown in FIG. 2, an output amplifier 22 has two output stages 24 and 26, and an internal resistor 28 (having a resistance $R_{int}$) coupled between the two stages. The first output stage 24 includes a first output transistor, such as a metal oxide semiconductor field effect transistor (MOSFEI) M1, and is coupled to a node 23. Similarly, the second output stage 26 includes a second output transistor M2, and is coupled to an output node 25. The device ratio of the first transistor M1 and the second transistor M2 is 1:N.

The output impedance $Z_{out}$ is given by $$Z_{out} = \frac{R_{int}}{1+N},$$

and the resistance $R_{int}$ is determined so that the output impedace $Z_{out}$ matches the line impedace $R_L$ seen by the amplifier 22. Since the internal resistor 28 is provided within the two output stages 24 and 26 of the amplifier 22, there is no matching resistor between the output node 25 of the amplifier 22 and the transformer. Therefore, the signal swing of the amplifier output (i.e., at the node 25) is directly supplied to the transformer, and thus is reduced by half compared to the conventional structure (FIG. 1) as described above, thereby reducing the required power of the amplifier 22.

A major drawback of the active termination structure shown in FIG. 2 however is that the synthesized impedace has sensitivity to line impedance variations, because the second output transistor 26 is not inside the closed loop configuration, as shown in FIG. 2. In the conventional active termination scheme 20, the line impedance Z is assumed to be constant and thus the synthesized output impedance $Z_{out}$ has a fixed value so as to match the constant line impedance Z. However, the actual line impedance is not constant and varies with frequency, and the frequency dependency of a transmission line also varies with the type of the transmission line, resulting in a mismatch of the synthesized impedance. Such a mismatch between the synthesized impedance and the actual line impedance degrades the linearity of the amplifier.

Typical achieved linearity level using the traditional active termination structure is around 40 dB. This level of linearity may be sufficient for voice-band communications, however, it is not acceptable in broadband communication applications such as xDSL transceivers. There is no known approach to solve this problem employing full active termination. Accordingly, it would be desirable to provide means for compensate such line impedance variation so as to improve the linearity of an amplifier and a line driver used for broadband communications.

BRIEF DESCRIPTION OF INVENTION

A line driver for coupling a data Deceiver to a transmission line having a load impedance via a transformer with a turns ratio of 1:n includes input port for receiving an input signal voltage from the data transceiver, an output port for supplying an output signal voltage to the transformer, and an amplifier circuit coupled with the input port, for amplifying the input signal voltage. The amplifier circuit includes a first output stage, a second output stage coupled to the output port, an output resistor coupled to the first output stage, a feedback path from the first output stage to an input of the amplifier circuit, and a line matching network coupled between the first output stage and the second output stage, for compensating variations in the load impedance, so that a synthesized output impedance of the line driver substantially matches an actual load impedance Z of the transmission line.

BRIEF DESCRIPTION OF THE DRAWINGS

The accompanying drawing, which are incorporated into and constitute a part of this specification, illustrate one or more embodiments of the present invention and, together with the detailed description, serve to explain the principles and implementations of the invention.

In the drawings:

FIG. 1 is a diagram illustrating a conventional line interface including a line driver amplifier, a hybrid circuit, a traditional back-termination resistor, and a transformer.

FIG. 2 is a illustrating a conventional active termination scheme for synthesizing the output impedance of an amplifier.

FIG. 3 is a diagram schematically illustrating an amplifier circuit in accordance with the present invention.

FIG. 4 is a diagram schematically illustrating an example of matching network using external R-L-C components.

FIG. 5A is a diagram illustrating an inverting type line driver including a line matching network in accordance with a specific embodiment of the present invention.

FIG. 5B is a diagram illustrating an example of a non-inverting type line driver.

FIG. 6 is a diagram illustrating a line driver including a line matching network in accordance with a specific embodiment of the present invention.

FIG. 7 is a diagram illustrating an example of simulation results showing the voltage difference between the first output stage and the second output stage.

FIG. 8 is a diagram schematically illustrating a line interface and circuitry used for optimizing the line matching network in accordance with a specific embodiment of the present invention.

FIG. 9 is a diagram schematically illustrating a method for matching an output impedance of a line driver with an actual load impedance of a transmission line in accordance with a specific embodiment of the present invention.

DETAILED DESCRIPTION

Embodiments of the present invention are described herein in the context of an amplifier and a line driver for broadband communications. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention describes a scheme to improve the performance of an amplifier employing full active termination. FIG. 3 schematically illustrates an amplifier circuit 30 in accordance with the present invention. The amplifier circuit 30 is typically used for a line driver coupling a signal from a data transceiver (not shown) to a transmission line 38 having a load impedance Z via a transformer 37 with a turns ratio of 1:n.

As shown in FIG. 3, the amplifier circuit 30 includes an operational amplifier 32 having a first output stage 34 and a second output stage 36. The first output stage 34 includes a first output transistor, such as a metal oxide semiconductor field effect transistor (MOSFET) M1, and is coupled to a node 43. Similarly, the second output stage 36 includes a second output transistor M2, and is coupled to an output node 39. The device ratio of the first transistor M1 and the second transistor M2 is 1:N. The output signal voltage of the amplifier circuit 30 is output from the output node 39, and supplied to the transformer 37. The amplifier circuit 30 also includes a feedback path 42 with a feedback resistance $R_f$ from the first output stage 34, and an output resistor 44 having a resistance R.

Instead of a fixed-value internal resistor ($R_{int}$) used in the traditional active termination scheme 20 as shown in FIG. 2, a line matching network 40 which has a variable $Z_m$ is used to compensate the line impedance variation. As shown in FIG. 3, the line matching network 40 is coupled between the first output stage 34 and the second output stage 36. The line matching network 40 may be an on-chip circuit implemented in the same IC-chip on which the amplifier circuit 30 is provided. Alternatively, the line matching network 40 may be an off-chip network connected between the two output stages 34 and 36, or between the corresponding nodes 43 and 39.

The line matching network 40 compensates variations in the load impedance so that a synthesized output impedance $Z_{out}$ of the amplifier circuit 30 substantially matches an actual load impedace Z of the transmission line 38. The output impedance $Z_{out}$ seen looking into the amplifier circuit 30 is given as $$Z_{out} = \frac{Z_m}{1+N},$$

and the impedance $Z_m$ is determined so that the output impedance $Z_{out}$ matches the line impedance $$R_L \left( = \frac{Z}{n^2} \right)$$

seen by the amplifier 30. Since the line matching network 40 compensates variation in the actual line impedance, the linearity of the amplifier circuit 30 is increased Various R, L, C combined configurations can be used for the matching network of the present invention, including various parallel and serial connections. FIG. 4 schematically illustrates an example of matching network 50 using external R-L-C components. As shown in FIG. 4, the line matching network 50 includes a plurality of matching circuits 52 (52-1, 52-2, . . . 52-m) coupled between a first terminal 54 and the second terminal 56. Each of the matching circuits 52 have a different filter characteristic corresponding to a different type of the transmission line. The first and second terminals 54 and 56 can be externally connected to the node 43 and the output node 39. For example, the external matching network 50 may be connected to the corresponding pins of the IC chip on which the amplifier circuit 30 is implemented.

As is well Known into those of ordinary skill in the art, there are many types of transmission line, for example, as specified by ANSI numbers. Each type of the transmission line has a different line characteristic that is frequency dependent, including the line impedance. Each matching circuit 52 has a filter characteristic optimized to compensate the frequency-dependent characteristic of a specific type of transmission line. Thus, the line matching network 50 is adaptive to a plurality of transmission line types, and can be optimized for a specific type of the transmission line that is actually used for the communication. For example, as shown in FIG. 4, the line matching network 50 may include a switching circuit 58 for selecting the matching circuits 52. Depending on the type of the transmission fine, one of the matching circuits 52 is switched in so as to optimize the filter characteristic for compensate the line impedance variation. For a different type of transmission line, another matching circuit is switched in and the previous one is switched out It should be noted that the structure of the line matching circuits 52 shown in FIG. 4 is merely an example, and there can be various R, L, C combined circuit designs depending on its actual implementation, and active filter circuit designs employing adaptive filtering techniques.

The matching network can also be implemented using on-chip RLC circuits. For example, an on-chip inductor could be either a physical spiral inductor or a simulated inductor using a gyrator. In addition, programmability can be easily achieved in a similar fashion as is done in traditional tuning scheme for active on-chip filters.

FIG. 5 illustrates a line driver 60 including a line matching network instead of a fixe value internal resistor, in accordance with a specific embodiment of the present invention. The line driver 60 couples a data transceiver to a transmission line having a load impedance via a transformer with a turns ratio of 1:n. The line driver 60 includes an input port 62 for receiving an input signal voltage $V_{in}$ from the data transceiver (not shown), and an output port 64 for supplying an output signal voltage $V_{out}$ to the transformer (not shown). The input port 62 includes a first input terminal 62a and a second input terminal 62b, and the output port 64 includes a first output terminal 64a and a second output terminal 64b.

The line driver 60 also includes a pre-amplifier (first-stage amplifier) 66, and first and second second-stage error amplifiers 70 and 80. Each error amplifier may include a P-type error amplifier and a N-type error amplifier, as shown in FIG. 5. The pre-amplifier 66 has a first input 67a coupled with the first input terminal 62a through an input resistance, a second input 97b coupled with the second input terminal 62b through an input resistance, a first output 68a, and a second output 68b.

The first error amplifier 70 is coupled to the first output 68a of the pre-amplifier 66, and has a first output stage 72 and a second output stage 74. The first output stage 72 is coupled to a first node 76, and the second output stage 74 is coupled to a second node 78. The second node 78 is coupled to the first output terminal 64a. Similarly, the second error amplifier 80 is coupled to the second output 68b of the pre-amplifier 66, and has a first output stage 82 and a second output stage 84. The first output stage 82 is coupled to a third node 86, and the second output stage 84 is coupled to a fourth node 88. The fourth node 88 is coupled to the second output terminal 64b.

The line driver 60 also includes a fist feedback path 79 from the first node 76 to the first input 67a, a second feedback path 89 from the third node 86 to the second input 67b, and an output resistor 69 coupled between the first node 76 and the third node 86. The line driver 60 further includes a first line matching network 90a coupled between the first node 76 and the second node 78, and a second line matching network 90b coupled between the third node 86 and the fourth node 88. The line matching networks 90a and 90b compensate variations in the load impedance so that a synthesized output impedance of the line driver 60 substantially matches air actual load impedance Z of the transmission line. The line matching networks 90a and 90b can be implemented in the same manner as the line matching network of the present invention as described above.

It should be noted tat although the tine driver 60 is illustrated as an inverting type line driver in this embodiment, the present invention is not limited by a specific type of line drivers. For example, the present invention is equally applicable to a non-inverting type line driver, such as a line driver 61 shown in FIG. 5B, as is well understood by those of ordinary skill in the art.

FIG. 6 illustrates a line driver 100 having a line matching network in accordance with a specific embodiment of the present invention. The line driver 100 has a configuration similar to that of the line driver 60 (FIG. 5) as described above, and like components an denoted by like reference numerals. However, the line driver 100 has a different output stage configuration than that of the line driver 60.

As shown in FIG. 6, instead of the first and second 90a and 90b and the output resistor 69 in the line driver 60, the line driver 100 has first and second output resistors 94a and 94b, and one line matching network 96. The first output resistor 94a is coupled between the flat node 76 and the second node 78, and the second output resistor 94b is coupled between the third node 86 and the fourth node 88. The line matching network 96 is coupled between the first node 76 and the third node 86, and compensates variations in the load impedance, so that a synthesize output impedance of the line driver substantially matches an actual load impedance Z of the transmission line. Compared with the line driver 60, the output configuration of the line driver 100 is simplified and thus preferable. This simplification can be done due to the symmetric structure of the differential-type line driver.

FIG. 7 illustrates an example of simulation results showing the voltage difference between the first output stage and the second output stage for the amplifier circuit of the present invention and for the conventional amplifier structure (FIG. 2) with respect to a transmission line referred to as CSA-4. A curve 102 shows the voltage at node 23 (FIG. 2) and node 43 (FIG. 3), that is, an output voltage of the closed loop of the amplifier. A curve 104 shows an output voltage at the output node 25 (FIG. 2) without compensation in a conventional active termination structure. A curve 106 shows the output voltage at the output node 39 (FIG. 3) for which the line impedance variation is compensated by the line matching network according to the present invention.

As can be seen in FIG. 7, the conventional active termination structure using a fixed matching resistance displays large voltage deviations, whereas the new structure using the matching network shows a small voltage difference between the node 43 and 39. The voltage difference between the closed loop output and the output node is directly related to the achievable linearity of the amplifier. The advantage of the present invention is its ability to maintain good linearity while still retaining the advantage of low power dissipation characteristics of active termination structure compared to the conventional store.

The present invention also provides an algorithm to choose and optimize the line matching circuitry. Referring back to FIG. 3, the optimum match is obtained when the voltage across the impedance $Z_m$ due to the transmit signal is zero. This condition is also the condition of an optimum hybrid rejection and echo suppression. An algorithm to determine the optimum setting for the R, L, C matching circuits can therefore be formulated using an optimization/search technique. For example, the voltage difference across the line matching circuit 40, or between the nodes 43 and 39, may be monitored using an analog circuit or an analog to digital converter (ADC). The power or magnitude of this voltage difference is obtained and then used to drive the search algorithm. The algorithm could be a simple brute force search or an optimization method such as Minimum Mean Square Error (MMSE).

Instead of adding additional circuitry to explicitly process the voltage difference across the line matching network (with the impedance $Z_m$), it is also possible to use the receive amplifier present in the hybrid circuit of any ADSL line interface. FIG. 8 schematically illustrates a line interface 110 used for an ADSL transceiver. The line interface 110 includes a line driver 112, a hybrid circuit 114, and a receive amplifier 116. The line driver 112 is illustrated as is implementing the configuration of the line driver 60 (FIG. 5) in accordance with a specific embodiment of the present invention. FIG. 8 only shows, for simplicity, relevant portions of the structure of the line driver 112, i.e., the nodes 76 and 86 of the first output stage, the nodes 78 and 88 of the second output stage, and the line matching networks 90a and 90b coupled between these nodes. The corresponding components bear the same numeral references as those shown in FIG. 5.

Because of the structure of the hybrid circuit 114, the output of the receive amplifier 116 is directly related to the voltage across the impedance $Z_m$ of the line matching networks 90a and 90b, assuming no receive signal (RX) is present. By using the receive amplifier 116 to monitor the voltage across the line matching networks, the amount of additional circuitry to be added to optimize the matching network setting can be minimized.

In accordance with a specific embodiment of the present invention, the output of the receive amplifier 116 could be fed directly to an analog-to-digital converter (ADC) 118 already on an analog front end (AFE) of the transceiver, in order to optimize the line matching network setting. The computation of the power of the signal may be done on a digital signal processing DSP processor 120.

FIG. 9 schematically illustrates a method for matching an output impedance of a line driver with an actual load impedance of a transmission line in accordance with a specific embodiment of the present invention. FIG. 8 is also referred to for explanation. First, a line matching network 90 (90a and 90b) is provided between the first output stage (nodes 76 and 86) and the second output stage (nodes 78 and 88) of the line driver circuit (130). As described above, the line matching network 90 includes a plurality of matching circuits, and each of the matching circuits has a different filter characteristic corresponding to a different type of the transmission line. The line matching network 90 may be on-chip or off-chip network, and may be active or passive.

Setting of the line matching network 90 is typically conducted during the initialization of the transceiver (modem) for a point-to-point (PTP) connection. For example, a first matching circuit among the plurality of matching circuit in the line matching network 90 is selected (132). During the initialization a test signal is sent by a transceiver (such as a PC modem) of the other side of the PTP connection, and is received by the transceiver though the transmission line (134). The data rate of the received test signal using the selected matching circuit is monitored (136), using, for example, the DSP 120. The test signal may contain various sub-carriers so as to determine the data rate over a specific frequency range allocated to the connected communication.

After monitoring the data rate, the selected matching circuit is switched out, and the next matching circuit is selected and switched in the network, then the data rate for the newly selected matching circuit is monitored. In this way, selecting a matching circuit, receiving the test signal, and monitoring the data rate are repeated for the remaining matching circuits (138). For example, when the matching network includes m matching circuits, this procedure is repeated from n=1 to n=m. By comparing the monitored data rates for all matching circuits, the matching circuit that achieves the maximum data rate is chosen as the optimum matching circuit (140). Since the data rate is a major barometer of the overall performance of the transceiver, to which the linearity of the amplifier directly related, the maximum data rate can be used for optimizing the line matching network setting.

The present invention provides a very efficient means of simultaneously achieving a good line impedance matching, essentially by means of an adaptive hybrid circuit compensating line impedance variations, as well as minimizing line driver power by means of impedance synthesis.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A line driver for coupling a data transceiver to a transmission line having a load impedance via a transformer with a turns ratio of 1:n, said line driver comprising:
   an input port for receiving an input signal voltage from said data transceiver;
   an output port for supplying an output signal voltage to said transformer; and
   an amplifier circuit coupled with said input port, for amplifying said input signal voltage, said amplifier circuit including:
   a first output stage;
   a second output stage coupled to said output port;
   an output resistor coupled to said first output stage;
   a feedback path from said first output stage to an input of said amplifier circuit; and
   a line matching network coupled between said first output stage and said second output stage, for compensating variations in said load impedance, so that a synthesized output impedance of said line driver substantially matches an actual load impedance Z of the transmission line.

2. The line driver according to claim 1, wherein said line driver includes a differential structure, said first output stage and said second output stage have a current ratio of 1:N, and an impedance $Z_m$ of said line matching network is selected so as to substantially satisfies $$\frac{Z_m}{1+N} = \frac{Z}{2n^2}$$

for each part of the differential structure.

3. The line driver according to claim 1, wherein said line driver includes a single-ended structure, said first output stage and said second output stage have a current ratio of 1:N, and an impedance $Z_m$ of said line matching network is selected so as to substantially satisfies $$\frac{Z_m}{1+N} = \frac{Z}{n^2}.$$

4. The line driver according to claim 1, wherein said line matching network includes a plurality of matching circuits, each of said matching circuits having a different filter characteristic corresponding to a different type of the transmission line.

5. The line driver according to claim 4, wherein each matching circuit has a filter characteristic for compensating frequency-dependent characteristics of the transmission line of a specific type.

6. The line driver according to claim 4, wherein said line matching network further includes a switching circuit for selecting one of said matching circuits.

7. The line driver according to claim 6, wherein said switching circuit is programmable.

8. The line driver according to claim 1, wherein said line matching network is provided on a same IC chip on which said line driver is provided.

9. The line driver according to claim 1, wherein said line matching network is externally provided to an IC chip on which said line driver is provided.

10. A line matching network for a line driver coupling a data transceiver to a transmission line via a transformer, said line driver including an amplifier circuit for amplifying an input signal voltage from said data transceiver, said amplifier circuit having a first output stage, a second output stage, and a feedback path from said first output stage to an input of said amplifier circuit, said line matching network comprising:
- a first terminal adapted to being coupled to said first output stage;
- a second terminal adapted to being coupled to said second output stage; and
- a plurality of matching circuits coupled in parallel between said first terminal and second terminal, each of said matching circuits having a different filter characteristic corresponding to a different type of the transmission line.

11. The line matching network according to claim 10, further including a switching circuit coupled between said plurality of matching circuits and one of said first and second terminals, for selecting and connecting one of said matching circuits to said one of first and second terminals in accordance with a type of the transmission line.

12. The line matching network according to claim 10, wherein each matching circuit has a filter characteristic for compensating frequency-dependent characteristics of the transmission line of a specific type.

13. An amplifier circuit for amplifying an input signal voltage, used for a line driver coupling a signal from a data transceiver to a transmission line having a load impedance via a transformer with a turns ratio of 1:n, said amplifier circuit comprising:
- an output node for outputting an output signal voltage from said amplifier circuit;
- a first output stage;
- a second output stage coupled to said output node; and
- a line matching network coupled between said first output stage and said second output stage, for compensating variations in said load impedance, so that a synthesized output impedance of said line driver substantially matches an actual load impedance Z of the transmission line.

14. The amplifier circuit according to claim 13, wherein said line driver includes a differential structure, said first output stage and said second output stage have a current ratio of 1:N, and an impedance $Z_m$ of said line matching network is selected so as to substantially satisfies $$\frac{Z_m}{1+N} = \frac{Z}{2n^2}$$

for each part of the differential structure.

15. The amplifier circuit according to claim 13, wherein said line driver includes a single-ended structure, said first output stage and said second output stage have a current ratio of 1:N, and an impedance $Z_m$ of said line matching network is selected so as to substantially satisfies $$\frac{Z_m}{1+N} = \frac{Z}{n^2}.$$

16. The amplifier circuit according to claim 13, wherein said line matching network includes a plurality of matching circuits, each of said matching circuits having a different filter characteristic corresponding to a different type of the transmission line.

17. The amplifier circuit according to claim 16, wherein each matching circuit has a filter characteristic for compensating frequency-dependent characteristics of the transmission line of a specific type.

18. The amplifier circuit according to claim 16, wherein said line matching network further includes a switching circuit for selecting one of said matching circuits.

19. The amplifier circuit according to claim 18, wherein said switching circuit is programmable.

20. A line driver for coupling a data transceiver to a transmission line having a load impedance via a transformer with a turns ratio of 1:n, said line driver comprising:
- an input port for receiving an input signal voltage from said data transceiver, said input port including a first input terminal and a second input terminal;
- an output port for supplying an output signal voltage to said transformer, said output port including a first output terminal and a second output terminal;
- a first-stage amplifier coupled to said input port, said first-stage amplifier having a first input coupled with said first input terminal, a second input coupled with said second input terminal, a first output, and a second output;
- a first second-stage amplifier coupled to said first output, said first second-stage amplifier including a first output stage coupled to a first node, and a second output stage coupled to a second node, said second node being coupled to said first output terminal;
- a second second-stage amplifier coupled to said second output, said second second-stage amplifier including a first output stage coupled to a third node, and a second output stage coupled to a fourth node, said fourth node being coupled to said second output terminal;
- a first feedback path from said first node to said first input;
- a second feedback path from said third node to said second input;
- an output resistor coupled between said first node and said third node; and
- a first line matching network coupled between said first node and said second node, and a second line matching network coupled between said third node and said fourth node, for compensating variations in said load impedance, so that a synthesized output impedance of said line driver substantially matches an actual load impedance Z of the transmission line.

21. The line driver according to claim 20, wherein said first and second second-stage amplifiers include a P-type error amplifier and an N-type error amplifier.

22. The line driver according to claim 20, wherein said first and second line matching networks include a plurality of matching circuits, each of said matching circuits having a different filter characteristic corresponding to a different type of the transmission line.

23. The line driver according to claim 22, wherein each matching circuit has a filter characteristic for compensating frequency-dependent characteristics of the transmission line of a specific type.

24. The line driver according to claim 22, wherein said first and second line matching networks further include a switching circuit for selecting one of said matching circuits.

25. The line driver according to claim 24, wherein said switching circuit is programmable.

26. The line driver according to claim 20, wherein said first and second line matching networks are provided on a same IC chip on which said line driver is provided.

27. The line driver according to claim 20 wherein said first and second line matching networks are externally provided to an IC chip on which said line driver is provided.

28. A line driver for coupling a data transceiver to a transmission line having a load impedance via a transformer with a turns ratio of 1:n, said line driver comprising:

an input port for receiving an input signal voltage from said data transceiver, said input port including a first input terminal and a second input terminal;

an output port for supplying an output signal voltage to said transformer, said output port including a first output terminal and a second output terminal;

a first-stage amplifier coupled to said input port, said first-stage amplifier having a first input coupled with said first input terminal, a second input coupled with said second input terminal, a first output, and a second output;

a first second-stage amplifier coupled to said first output, said first second-stage amplifier including a first output stage coupled to a first node, and a second output stage coupled to a second node, said second node being coupled to said first output terminal;

a second second-stage amplifier coupled to said second output, said second second-stage amplifier including a first output stage coupled to a third node, and a second output stage coupled to a fourth node, said fourth node being coupled to said second output terminal;

a first feedback path from said first node to said first input;

a second feedback path from said third node to said second input;

a first output resistor coupled between said first node and said second node;

a second output resistor coupled between said third node and said fourth node; and a line matching network coupled between said first node and said third node, for compensating variations in said load impedance, so that a synthesized output impedance of said line driver substantially matches an actual load impedance Z of the transmission line.

29. The line driver according to claim 28, wherein said first and second second-stage amplifiers include a P-type error amplifier and an N-type error amplifier.

30. The line driver according to claim 28, wherein said line matching network includes a plurality of matching circuits, each of said matching circuits having a different filter characteristic corresponding to a different type of the transmission line.

31. The line driver according to claim 30, wherein each matching circuit has a filter characteristic for compensating frequency-dependent characteristics of the transmission line of a specific type.

32. The line driver according to claim 30, wherein said line matching network further includes a switching circuit for selecting one of said matching circuits.

33. The line driver according to claim 32, wherein said switching circuit is programmable.

34. The line driver according to claim 28, wherein said line matching network is provided on a same IC chip on which said line driver is provided.

35. The line driver according to claim 28, wherein said line matching network is externally provided to an IC chip on which said line driver is provided.

36. A method for matching an output impedance of a line driver with an actual load impedance of a transmission line, said line driver coupling a data transceiver to said transmission line via a transformer, said line driver including an amplifier circuit for amplifying an input signal voltage from said data transceiver, said amplifier circuit having a first output stage, a second output stage, and a feedback path from said first output stage to an input of said amplifier circuit, said method comprising:

providing a line matching network between said first output stage and said second output stage, said line matching network including a plurality of matching circuits, each of said matching circuits having a different filter characteristic corresponding to a different type of the transmission line; and selecting one of said matching circuits in accordance with a type of the transmission line.

37. The method according to claim 36, wherein said selecting includes:

selecting a first matching circuit of said line matching network;

receiving a test signal from the transmission line;

monitoring a data rate of said test signal received by the data transceiver;

repeating said selecting, said receiving, and said monitoring for the remaining matching circuits; and determining and selecting one matching circuit achieving a maximum data rate.

38. An apparatus for matching an output impedance of a line driver with an actual load impedance of a transmission line, said line driver coupling a data transceiver to said transmission line via a transformer, said line driver including an amplifier circuit for amplifying an input signal voltage from said data transceiver, said amplifier circuit having a first output stage, a second output stage, and a feedback path from said first output stage to an input of said amplifier circuit, said apparatus comprising:

means for providing a plurality of filter characteristics between said first output stage and said second output stage, each of said plurality of filter characteristics corresponding to a different type of the transmission line; and means for selecting one of said filter characteristics in accordance with a type of the transmission line.

39. The apparatus according to claim 38, wherein said means for providing includes the plurality of matching circuits each having a different filter characteristic, and wherein said means for selecting includes:
means for coupling one of said matching circuits between said first output stage and said second output stage;
means for receiving a test signal from the transmission line;
means for monitoring a data rate of said test signal received by the data transceiver;
means for repeating said selecting, said receiving, and said monitoring for the remaining matching circuits; and
means for determining one matching circuit achieving a maximum data rate.

40. The line driver according to claim 20, wherein said first output stage and said second output stage have a current ratio of 1:N, and a total impedance $Z_m$ of said first line matching network and said second line matching network is selected so as to substantially satisfies $$\frac{Z_m}{1+N} = \frac{Z}{n^2}.$$

41. The line driver according to claim 28, wherein said first output stage and said second output stage have a current ratio of 1:N, and an impedance $Z_m$ of said line matching network is selected so as to substantially satisfies $$\frac{Z_m}{1+N} = \frac{Z}{n^2}.$$

* * * * *